United States Patent [19]

Yamagishi et al.

[11] 3,869,709

[45] Mar. 4, 1975

[54] MAGNETIC RECORDING AND/OR REPRODUCING APPARATUS HAVING ROTARY HEADS WITH STILL MODE OF OPERATION

[75] Inventors: Jin Yamagishi, Tokyo; Hiroaki Momiyama, Fujimi, both of Japan

[73] Assignee: Sony Corporation, Tokyo, Japan

[22] Filed: Sept. 28, 1973

[21] Appl. No.: 401,822

[30] Foreign Application Priority Data

Sept. 29, 1972 Japan .............................. 47-114004

[52] U.S. Cl. ......................... 360/10, 360/14, 360/33

[51] Int. Cl.... H04n 5/78, G11b 21/02, G11b 15/18

[58] Field of Search. 179/100.2 T, 100.2 S, 100.1 S; 178/6.6 FS; 360/10, 14, 27, 33, 74, 73, 84

[56] References Cited

UNITED STATES PATENTS

| | | | |
|---|---|---|---|
| 3,294,902 | 12/1966 | Maxey | 178/6.6 FS |
| 3,375,331 | 3/1968 | Okazaki et al. | 179/100.2 T |
| 3,376,395 | 4/1968 | Rumple | 178/6.6 FS |
| 3,389,217 | 6/1968 | Kihara | 178/6.6 FS |
| 3,663,764 | 5/1972 | Trost et al. | 179/100.2 T |

*Primary Examiner*—Alfred H. Eddleman
*Attorney, Agent, or Firm*—Lewis H. Eslinger; Alvin Sinderbrand

[57] ABSTRACT

A magnetic recording and/or reproducing device having a rotary magnetic head and a tape guide drum about which a run of movable magnetic tape is wrapped, the magnetic head adapted to scan the magnetic tape in skewed relation thereto. Apparatus is provided for controlling the rotary magnetic head including driving means for rotating the head and mode changing means for selectively changing the mode of operation of the magnetic recording and/or reproducing device between a normal reproducing mode wherein the magnetic tape moves and the rotary head moves relative to the tape and a still reproducing mode wherein plural reproductions of the information recorded on a limited portion of the magnetic tape are made. Tape run control means responds to the mode changing means for stopping the movement of the tape when the mode of operation of the magnetic recording and/or reproducing device is changed from a normal reproducing mode to a still reproducing mode. The driving means is controlled by drive control means to thereby regulate the rotational speed of the rotary head for each of the modes of operation of the magnetic recording and/or reproducing device such that a first rotational speed is substantially maintained during a normal reproducing mode of operation and a second rotational speed is substantially maintained during a still reproducing mode of operation. In one preferred embodiment, the rotary head is phase synchronized with signals prerecorded on the magnetic tape.

20 Claims, 4 Drawing Figures

PATENTED MAR 4 1975

3,869,709

SHEET 2 OF 3

MAGNETIC RECORDING AND/OR REPRODUCING APPARATUS HAVING ROTARY HEADS WITH STILL MODE OF OPERATION

BACKGROUND OF THE INVENTION

This invention relates to magnetic recording and/or reproducing apparatus and, in particular, to such apparatus having rotary magnetic heads and being adapted for a normal mode of operation and a still mode of operation, the latter mode providing the repetitive reproducing of information recorded on a limited portion of the magnetic tape that is used with the apparatus.

A conventional magnetic recording and/or reproducing apparatus that is particularly adapted for the recording and reproducing of video signals on magnetic tape includes a guide drum and one or more rotary magnetic heads. Such video tape recording apparatus (VTR) usually includes an automatic frequency control circuit and an automatic phase control circuit so as to reproduce a properly synchronized video picture exhibiting proper chrominance and fidelity with the recorded video signals. Such automatic frequency and phase control circuits are generally provided to compensate for errors, such as timing errors, that occur during video signal reproductions that might be caused by nonuniform or erratic movement of the tape and/or irregular rotation of the rotary magnetic heads. Typically, automatic frequency and phase control circuits exhibit well-defined ranges within which the frequency and the phase of the reproduced signals may be adjusted and locked to desired frequencies, unfortunately, there are limits to the range of frequencies that may be controlled or locked. Accordingly, if the time error of a reproduced signal exceeds the intrinsic frequency adjustment range, the control circuits are not readily capable of locking the frequency of the reproduced signal, thereby hindering the reproduction of a synchronized video signal that is a faithful reproduction of the color video picture recorded on the video tape.

The foregoing problem is particularly acute when a still video picture is to be reproduced from the prerecorded video tape. Such still video picture is recognized as a conventional "stop-action" video display wherein the video picture is effectively "frozen." To obtain the still mode of reproduction it is generally necessary to arrest the movement of the magnetic tape such that the rotary magnetic head repeatedly scans a limited portion of the stationary tape run. The change in the scanning speed of the video signals, that are typically recorded in skewed tracks, when the video tape is held stationary complicates the problem of reproducing a synchronized video picture having proper chrominance during a still reproducing mode.

SUMMARY OF THE INVENTION

Therefore, it is an object of the present invention to provide a magnetic recording and/or reproducing apparatus adapted for a normal mode of signal reproduction and a still mode of signal reproduction.

It is another object of the invention to provide an improved magnetic recording and/or reproducing device capable of operation with video recording tape for reproducing a correctly synchronized still video picture exhibiting proper chrominace characteristics.

A still further object of the present invention is to provide an improved magnetic recording and/or reproducing device having a rotary magnetic head wherein the rotational speed of the rotary head is changed in accordance with a selected normal or still mode of signal reproduction.

Another object of this invention is to provide an improved magnetic recording and/or reproducing device having a rotary magnetic head wherein a prerecorded video tape is moved through the device during a normal reproducing mode and wherein the prerecorded video tape is maintained stationary during a still reproducing mode whereby a stable still video picture is reproduced by rotating the magnetic head at a compensated speed.

Various other objects and advantages of the present invention will become clear from a detailed description set forth below and the novel features are particularly pointed in the appended claims.

In accordance with this invention, a magnetic recording and/or reproducing device has a rotary magnetic head and a tape guide drum about which a run of movable magnetic tape is wrapped, the rotary head scanning the magnetic tape run in skewed relation, and including apparatus for controlling the rotary head wherein the head is driven by an electric motor; the mode of operation of the magnetic recording and/or reproducing device may be selectively changed between a normal reproducing mode wherein the magnetic tape and rotary head both move, the rotary head exhibiting relative motion with respect to the tape, and a still reproducing mode wherein plural reproductions of the information recorded on a limited portion of the magnetic tape are made; the movement of the magnetic tape is stopped when the magnetic recording and/or reproducing device admits of a mode of operation that is changed from the normal reproducing mode to the still reproducing mode; and the rotating speed of the rotary head is controlled for each mode of operation whereby a first rotating speed is substantially maintained during a normal reproducing mode of operation and a second rotating speed is substantially maintained during a still reproducing mode of operation. In a preferred embodiment the rotating speed of the rotary head is changed in accordance with the mode of operation of the magnetic recording and/or reproducing device.

The present invention finds ready application in video tape recording (VTR) techniques. Although the change in the rotating speed of the rotary head results in a corresponding change in the frequency of the vertical synchronizing signal, the altered rotating speed results in a horizontal synchronizing signal and color subcarrier signal of the proper frequencies. Consequently, the reproduced video picture is a stable, synchronized picture having the proper chrominance during the still mode of signal reproduction. Since the frequency of the vertical synchronizing signal is relatively low (for example, 60Hz), the change in the rotating speed of the rotary head results in a very small, essentially insignificant, change in the vertical synchronizing signal frequency. This small change has a negligible effect on the reproduced video picture.

BRIEF DESCRIPTION OF THE DRAWINGS

The forthcoming detailed description will be readily understood by reference to the following drawings in which.

DETAILED DESCRIPTION OF ONE OF THE PREFERRED EMBODIMENTS

Figure 1:
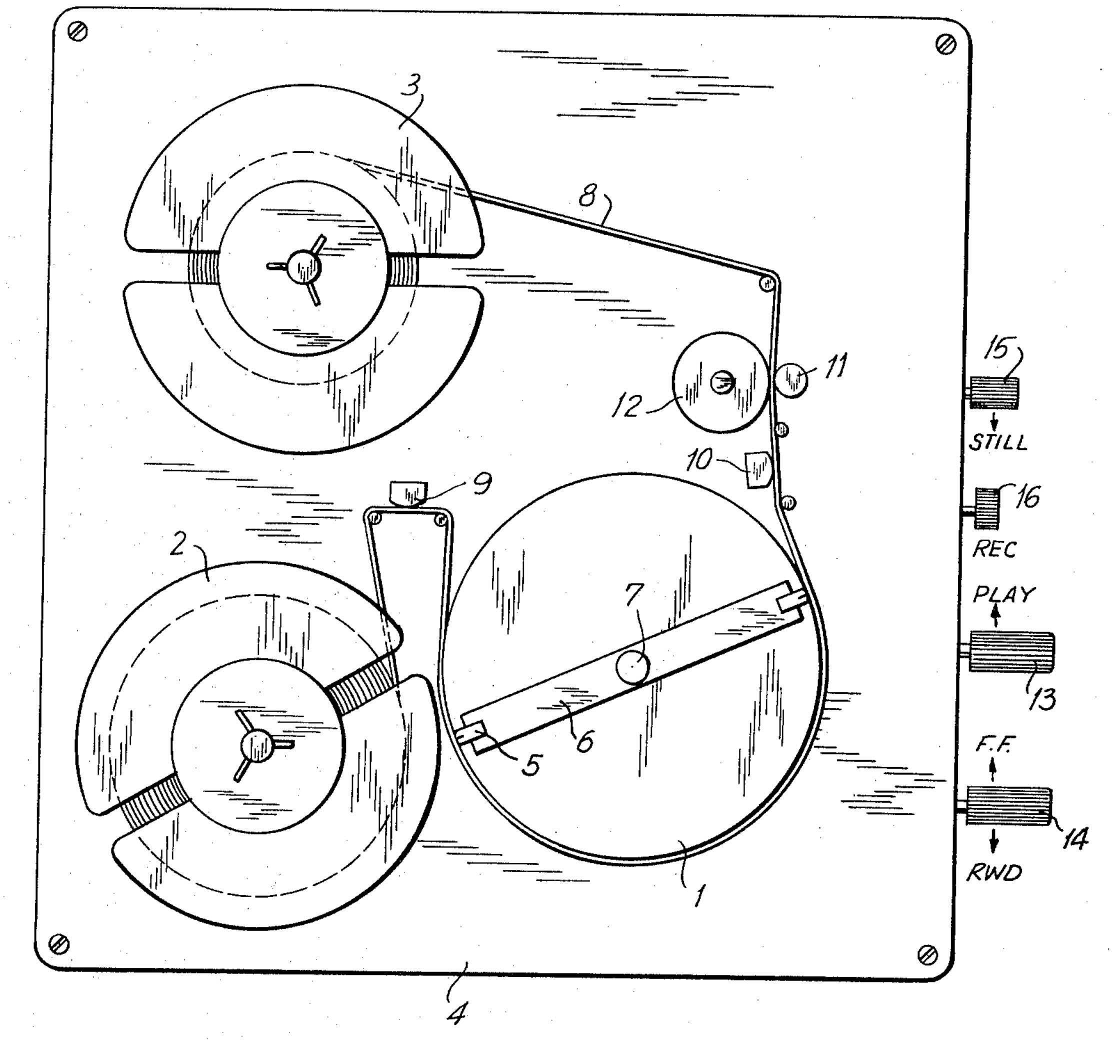
FIG. 1 is a top view of an improved magnetic recording and/or reproducing device with which the present invention may be employed.

Referring now to the drawings wherein like reference numerals are used throughout and, in particular, to FIG. 1, there is illustrated a top view of magnetic recording and/or reproducing apparatus with which the present invention finds ready application. To facilitate an understanding of the illustrated apparatus, it may be assumed that the magnetic recording and/or reproducing device is a video tape recording device (VTR). However, it should be clearly understood that the teachings of the present invention may be readily employed for the recording and/or reproducing of an information signal of any type on magnetic tape. Thus, although the present invention is advantageously employed in VTR techniques, it should not be unnecessarily limited thereto.

As depicted in FIG. 1, the magnetic recording and/or reproducing device comprises a magnetic tape guide drum 1, a tape supply reel 2 and a take-up reel 3. These elements are suitably supported on a base 4 which may comprise the top panel of a housing. The magnetic tape guide drum 1 is conventional and includes at least one rotary head 5 adapted to scan a run of magnetic tape deployed about the periphery of the tape guide drum. Preferably, two rotary magnetic heads are secured to opposite ends of a rotary arm 6, the rotary arm having an axis 7 that is driven by a suitable rotary motion imparting device, such as a conventional motor. The rotating speed of the rotary arm 6 is 30 r.p.s. during a normal reproducing mode of operation. Preferably, the tape guide drum 1 includes a slit over which the magnetic tape is wrapped such that the rotary heads 5 may scan the tape by contacting that portion of the tape that overlies the slit.

The magnetic tape 8 extends from the supply reel 2 about suitable guide pins to the guide drum 1 and from the drum to the take-up reel 3 by running past further guide members. The run of tape 8 is wrapped about the guide drum 1 in a helical path that is in overlying relation with respect to the slit therein over an angular extent of the drum that is greater than 180°. It may be observed that the run of magnetic tape 8 passes an erase head 9 between the supply reel and the guide drum as well as a control head 10 and capstan 11 positioned between the guide drum and take-up reel. The control head 10 may include a signal pick-up head as will be described hereinbelow. The capstan 11 is adapted to be driven in the conventional manner and cooperates with a pinch roller 12 to uniformly drive the magnetic tape 8. That is, the capstan and pinch roller are adapted for pressure contact to thereby engage the run of tape interposed therebetween. Furthermore, conventional driving apparatus may be employed to rotate the take-up reel 3 and/or the supply reel 2 to permit the uniform supply and take-up of tape. Such driving apparatus is conventional and, therefore, further description thereof need not be provided. Additionally, a conventional braking device may cooperate with the take-up reel 3 and/or the supply reel 2 to arrest the rotation thereof when the tape 8 is stopped.

Manually operable control members 13, 14, 15 and 16 are depicted on the right-hand side, for example, of the base 4 as illustrated in FIG. 1. Control members 13, 14 and 15 are, typically, control knobs designated PLAY, F.F./RWD and STILL, respectively. Control member 16 is, typically, a button adapted when operated to execute a recording operation and is therefore designated REC. It is recognized that the selected operation of each of the illustrated control members permits the magnetic recording and/or reproducing device to execute a corresponding operation upon the magnetic tape 8. For example, control knob 13 admits of a quiescent position and a PLAY position. When in the PLAY position, the magnetic tape 8 is moved from the supply reel 2 about the tape guide drum 1 to the take-up reel 3 by capstan 11 to permit the signal precorded on the magnetic tape in skewed or oblique tracks to be reproduced by the magnetic heads 5 as the heads scan the successive skewed tracks on the tape wrapped about the guide drum. Control knob 14 admits of a fast forward position F.F. and a fast rewind position RWD. When in the F.F. position, the magnetic tape 8 is rapidly advanced from the supply reel 2 to the take-up reel 3 without the concurrent reproduction of the signals prerecorded thereon. Similarly, when control knob 14 is placed in the RWD position, the magnetic tape 8 is rapidly rewound from the take-up reel 3 to supply reel 2 without the reproduction of prerecorded signals. The control knob 15 admits of a normal position and a STILL position. When disposed in its NORMAL position, and when the control knob 13 is in its PLAY position, the magnetic recording and/or reproducing device is adapted to reproduce signals prerecorded on the magnetic tape 8 as the tape is advanced from the supply reel to the take-up reel and moves about the periphery of the tape guide drum. When the control knob 15 is then positioned to its STILL position, the magnetic tape movement is stopped and a skewed track on that portion of the stationary tape deployed about the periphery of the tape guide drum is repetitively scanned by the rotary heads 5 such that plural reproductions of the prerecorded information are made.

As will soon be described, the positioning of control knob 15 at its STILL location serves to release the combination of the capstan 11 and pinch roller 12 from pressure engagement with the tape 8. It may be appreciated that the knob 15 is adapted to be moved to the STILL location during the execution of a normal reproducing mode, i.e., when it is desired to arrest the movement of the tape 8 so as to reproduce a stop-action or frozen video picture. Of course, various control knobs and buttons may be provided to effect any desired operation of the magnetic recording and/or reproducing device. The illustrated embodiment is merely one example of a representative device.

Figure 2:
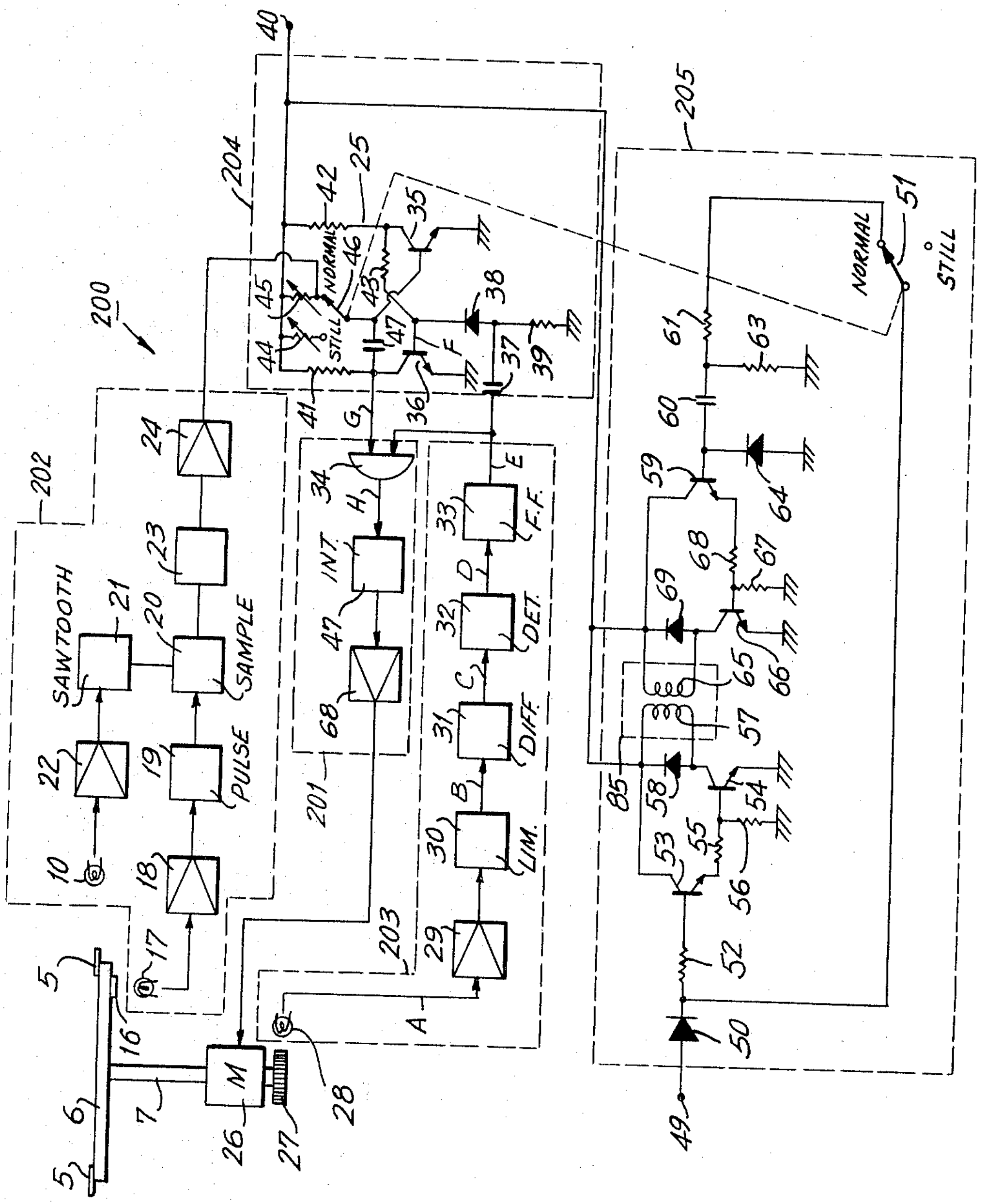
FIG. 2 is a schematic diagram of one preferred embodiment of control apparatus in accordance with the present invention for controlling the operation of a magnetic recording and/or reproducing device.

A preferred embodiment of the apparatus that may be employed to respond to the selective operation of control knob 15 to thereby permit a stable synchronized colored video picture reproduction during the STILL reproducing mode is illustrated in FIG. 2. The rotary arm 6 having the magnetic heads 5 secured thereto and being adapted for rotation about axis 7 is again illustrated. An electric motor 26 is coupled to the rotary axis 7 to thereby drive the rotary heads at a rotating speed determined by the motor. Typically, the rotary axis 7 may comprise a drive shaft that is directly coupled to the output shaft of the electric motor 26 or that is secured to the motor output shaft through conventional speed reducing apparatus. A motor drive system 200 in accordance with the present invention is coupled to the electric motor and is adapted to monitor the scanning of the tape by the rotary heads 5. The motor drive system comprises a gate circuit 201, a relative position detector 202, an actual speed detector 203 and a signal source 204. Additionally, a tape run energizing circuit 205 is illustrated. Briefly, the gate circuit 201 is coupled to the electric motor 26 to supply suitable energization to the motor whereby the motor is driven at a corresponding speed to rotate the rotary heads 5. The gate circuit 201 serves to compare the coincidence between a signal derived by the actual speed detector 203 and a signal derived by the signal source 204 to supply a corresponding energizing signal to the motor. Additionally, the speed of the electric motor is compensated in accordance with any detected deviations in the relative position of the rotary heads 5 and vertical synchronizing signals prerecorded on the moving tape 8. Hence, the magnetic tape is scanned during the normal reproducing mode at a substantially constant rate and in proper phase notwithstanding undesired irregularities or deviations in the rotating speed of the rotary heads.

To permit the sensing of the proper position of the rotary head 5, a conventional transducer 17 is provided. In a preferred embodiment, transducer 17 is a magnetic pick-up device adapted to cooperate with a magnetic element 16 secured to the rotary arm 6. As is understood, the magnetic pick-up device 17 generates an output signal when the magnetic element 16 rotates into proximity therewith. Accordingly, a periodic signal having a frequency proportional to the rotating speed of the rotary arm 6 is produced by the transducer. It should be recognized that various alternative transducers may be employed such as optical transducers and the like. The output of transducer 17 is coupled to a pulse shaping circuit 19 via amplifier 18. The pulse shaping circuit is conventional and is adapted to shape the periodic signal supplied thereto to a suitable sampling pulse for application to a sampling circuit 20.

The control head 10, illustrated in FIG. 1, is reproduced here and is adapted to produce output signals representative of the translational position of the tape 8. Accordingly, the control head may comprise a conventional magnetic pick-up element capable of sensing appropriate mark signals, such as vertical synchronizing signals, periodically recorded along the length of the magnetic tape or other detectable marks. In any event, a suitable signal, such a periodic signal is produced representing the position of the tape as it is moved with respect to the guide drum. The control head 10 is coupled to a voltage generator 21 by an amplifier 22. In a preferred embodiment, the voltage generator comprises a sawtooth generator capable of generating a voltage having a sawtooth waveform and wherein the period of each sawtooth waveform is dependent upon the speed of tape 8.

The output of the voltage generator is coupled to the sampling circuit 20 which also receives the output of the pulse shaping circuit 19. The sampling circuit may comprise a conventional gate responsive to the sampling pulses applied thereto by the pulse shaping circuit 19 to thereby sample the magnitude of the signal produced by the voltage generator 21. It may be appreciated that the sampled voltage obtained by the sampling circuit 20 is representative of the relative position of the rotary heads 5 with respect to the vertical synchronizing signals recorded on the moving tape 8. That is, if the rotary heads lag behind a frame of information signals recorded on the tape, for example, the sampled voltage produced by the sampling circuit correspondingly increases. Similarly, if the rotary heads lead a frame of information the magnitude of the sampled voltage decreases. This relationship may be understood by recognizing that the time at which the sawtooth voltage, for example, produced by the voltage generator 21 is sampled is a function of the position of the rotary heads 5. Additionally, the magnitude of the voltage obtained by the sawtooth waveform at the sampling time is a function of the position of the tape 8 and thus the frames of information recorded thereon. If the heads are rotated to a signal pick-up position in advance of a frame of information, it is appreciated that the magnitude obtained by the sawtooth waveform at the time such waveform is sampled by a sampling pulse is reduced. conversely, if the heads are rotated into a signal pick-up position behind a frame of information, it may be observed that the magnitude obtained by the sawtooth waveform at the time such waveform is sampled by the sampling pulses is increased.

A conventional holding, or storing circuit 23 is coupled to the output of sampling circuit 20 to store the sampled voltage produced by the sampling circuit. Accordingly, the holding circuit may comprise a conventional capacitor or other storage device well known to those of ordinary skill in the art. Alternatively, the sampling circuit 20 and the holding circuit 23 may be combined in a single conventional sample-and-hold circuit to sample and hold a voltage whereby the stored voltage magnitude is representative of the relative position of the tape 8 that is scanned by the heads 5. The holding circuit is coupled to the signal source 204 by an amplifier 24.

The actual speed of the electric motor 26, and thus the actual rotating speed of the rotary heads 5, is represented by a signal produced by a speed sensing transducer 28 adapted to produce a signal having a requency proportional to the speed of the electric motor and a pulse generating circuit adapted to convert the frequency signal to a pulse duration representing the actual speed of the motor. Preferably, the transducer 28 comprisess a conventional magnetic transducer, such as a multi-gap pick-up head, proximately disposed to a conventional magnetic wheel 27, the latter being fixed to the rotary axis 7. As is well understood, the combination of the magnetic wheel 27 and the magnetic transducer 28 comprises a frequency generator for producing the aforedescribed frequency signal proportional to the output speed of the motor 26. The frequency-to-pulse-width converter coupled to the magnetic transducer 28 preferably comprises an amplifier 29, limiter 30, differentiator 31, detector 32 and flip-flop circuit 33. It is appreciated that the illustrated frequency-to-pulse-width converter is merely exemplary and any suitable alternative circuit may be employed. The amplifier 29, in combination with the limiter 30, is adapted to produce a frequency signal of uniform amplitude. Preferably, the frequency signal produced thereby is a rectangular signal. The differentiator 31 is conventional and is adapted to respond to the positive and negative transitions of the rectangular signal to produce corresponding positive and negative pulses. It may be appreciated that the combination of the amplifier 29, limiter 30 and differentiator 31 may be replaced by a conventional zero-crossing detector.

The detector 32 is coupled to the differentiator 31 and is adapted to detect the differentiated pulses admitting of a predetermined polarity. For example, the detector 32 may comprise a suitable rectifier to pass only the positive differentiated pulses. Alternatively, the detector may comprise a suitable rectifier to pass only the negative differentiated pulses. Consequently, it is appreciated that the combination of the amplifier, limiter, differentiator and detector may be replaced by a conventional positive or negative zero-crossing detector.

The flip-flop circuit 33 is of conventional design and is coupled to the output of detector 32. Accordingly, the flip-flop circuit admits of first and second stable states and is adapted to be switched between said first and second stable states in response to the application thereto of a pulse. Thus, the duration of the output pulses produced by the flip-flop circuit 33 is dependent upon the time spacing between successive differentiated pulses applied thereto by the detector 32. In this manner, the flip-flop circuit is adapted to produce a pulse have a duration dependent upon the frequency of the signal generated by the transducer 28.

The flip-flop circuit 33 is coupled to the gate circuit 201 and to the signal source 204. The signal source 204 responds to the signal supplied thereto as a bias voltage by the relative position detector 202, to produce a pulse signal having a duration representing a given rotating speed. The manner in which the pulse duration signal is produced by the signal source 204 is set forth hereinbelow. It is observed that the output of the signal source is coupled to the gate circuit 201.

The gate circuit 201 is adapted to detect the coincidence of the respective pulse signals applied thereto by the flip-flop circuit 33 and the signal source 204 and to supply an appropriate energizing signal to the electric motor 26. More particularly, the respective durations of the pulse signals applied to the gate circuit 201 are compared and the energizing signal supplied to the electric motor is varied if the pulse durations fail to satisfy a predetermined relation. Preferably, the gate circuit 201 comprises a coincidence detecting circuit 34, an integrator 47 and an amplifier 48. The coincidence circuit 34 may comprise any conventional signal coincidence detector, such as a conventional AND gate, wherein a pulse output signal is produced only when pulse signals are applied to the input terminals thereof in coincidence. Accordingly, an output pulse is produced by the coincidence circuit 34 when the pulse applied thereto by the flip-flop circuit 33 coincides in time with the pulse applied thereto by the signal source 204. The output of the coincidence circuit 34 is coupled to the integrator 47 whereby the pulse duration is converted to a voltage magnitude. Such integrators are conventional devices and need not be further described. The voltage magnitude produced by the integrator 47 is amplified to a suitable level to to thus form an energizing signal to be supplied to the electric motor 26.

In a preferred embodiment, the signal source 204 comprises a pulse generator adapted to generate a pulse having a selectively variable duration. It is recalled that the present invention serves to compensate the rotating speed of the rotary heads 5 when the magnetic recording and/or reproducing device that employs the rotary heads is operated in a normal reproducing mode or a still reproducing mode. Accordingly, the pulse generator that may comprise the signal source 204 may include a selectively variable time constant to thus determine a first pulse duration for a normal reproducing mode of operation and a second pulse duration for a still reproducing mode of operation. The first pulse duration is thus determinative of a given rotating speed for the rotary heads 5 when the rotary heads scan the moving magnetic tape 8. Similarly, the second pulse duration is determinative of a given rotating speed for the rotary heads when the stationary magnetic tape is scanned. To compensate for a possible out-of-phase relationship between the rotary heads 5 and the prerecorded frames of information, the first pulse duration is adjustable in accordance with the sampled voltage magnitude stored in the holding circuit 23. It is observed that the second pulse duration need not be similarly adjustable since the magnetic tape 8 is maintained stationary during the still reproducing mode of operation.

Although any suitable pulse generator adapted to produce a selectively variably pulse duration may be employed, an exemplary embodiment is illustrated in FIG. 2. In accordance with the illustrated embodiment, the pulse generator is seen to comprise a conventional monostable multivibrator having first and second cross-coupled transistors 35 and 36. The collector electrode of transistor 35 is coupled to a suitable source 40 of energizing potential by collector resistor 42. The emitter electrode of transistor 35 is coupled to ground. The collector electrode of transistor 36 is likewise coupled to the source 40 by a collector resistor 41. The emitter electrode of the transistor 36 is coupled to ground. Additionally, the collector electrode of the transistor 36 is coupled to the base electrode of the transistor 35 by a capacitor 47. The base electrode of the transistor 35 is further coupled to the source 40 by a selected one of variable resistors 44 and 45 as determined by the selected operation of switch 46. the base electrode of the transistor 36 is coupled to the collector electrode of the transistor 35 by a resistor 43. Additionally, the base electrode of the transistor 36 is coupled to the output of the flip-flop circuit 33 by the series connection of capacitor 37 and diode 38. The junction defined by the capacitor and diode is coupled to ground by a resistor 39. It may be recognized that the time constant of the monostable multivibrator, i.e., the time duration for which the monostable multivibrator remains in its unstable state in response to a triggering pulse supplied thereto, is determined by the combination of capacitor 47 and either resistor 44 or resistor 45. Fine adjustment of the time constant of the monostable multivibrator is facilitated by providing each of the resistors 44 and 45 as a variable resistor, such as a potentiometer, a rheostat, or the like. The switch 46 includes a first stationary contact coupled to the resistor 45 and identified as the NORMAL contact. Additionally, a second stationary contact is coupled to the resistor 44 and is identified as the STILL contact. The movable contact of the switch 46 is adapted to selectively engage the NOR- MAL or STILL contacts in accordance with an operation to be described in detail below. The NORMAL contact of the switch 46 is additionally coupled to the amplifier 24 to receive a biasing voltage that is proportional to the relative position at which tape 8 is scanned by the rotary heads 5.

The monostable multivibrator illustratively depicted in FIG. 2 is adapted to operate in the conventional manner. The stable state normally exhibited by the monostable multivibrator is represented by the conducting state of the transistor 35 and the non-conducting state of the transistor 36. That is, in the stable state, the voltage normally applied to the base electrode of the transistor 35 is sufficient to drive the transistor to its conducting state such that a low potential is provided at the collector electrode thereof. This low potential is cross-coupled to the base electrode of transistor 36 and is not sufficient to drive the latter transistor to its conducting state. Accordingly, the transistor 36 admits of its non-conducting state such that a relatively high voltage is provided at the collector electrode thereof and coupled to an input terminal of coincidence circuit 34.

When a triggering pulse is applied to the base electrode of the transistor 36 via capacitor 37 and diode 38 from the flip-flop circuit 33, the voltage momentarily provided at the base electrode of the transistor is sufficient to drive that transistor to its conducting state. Accordingly, the voltage at the collector electrode thereof rapidly drops and a low voltage is thus cross-coupled to the base electrode of the transistor 35 by the capacitor 47. Consequently, the transistor 35 is driven to its non-conducting state such that a relatively high voltage appears at the collector electrode thereof When the triggering pulse is removed from the base electrode of the transistor 36, the capacitor 47 gradually charges until a suitable voltage is applied thereby to the base electrode of the transistor 35 to thus drive the transistor to its conducting state, whereby the transistor 36 is returned to its non-conducting state. It is appreciated that the length of time required to sufficiently charge the capacitor 47, is determined by the particular resistor 44 or 45 coupled thereto via switch 46. The RC time constant is the time constant of the illustrated monostable multivibrator and is thus determinative of the duration of the pulse applied thereby to the coincident circuit 34. It is recognized that the recovery time of the monostable multivibrator, that is, the time required for the monostable multivibrator to be restored to its stable state, is also influenced by the bias voltage applied thereto by the amplifier 24 of the relative position detector 202.

Figure 4:
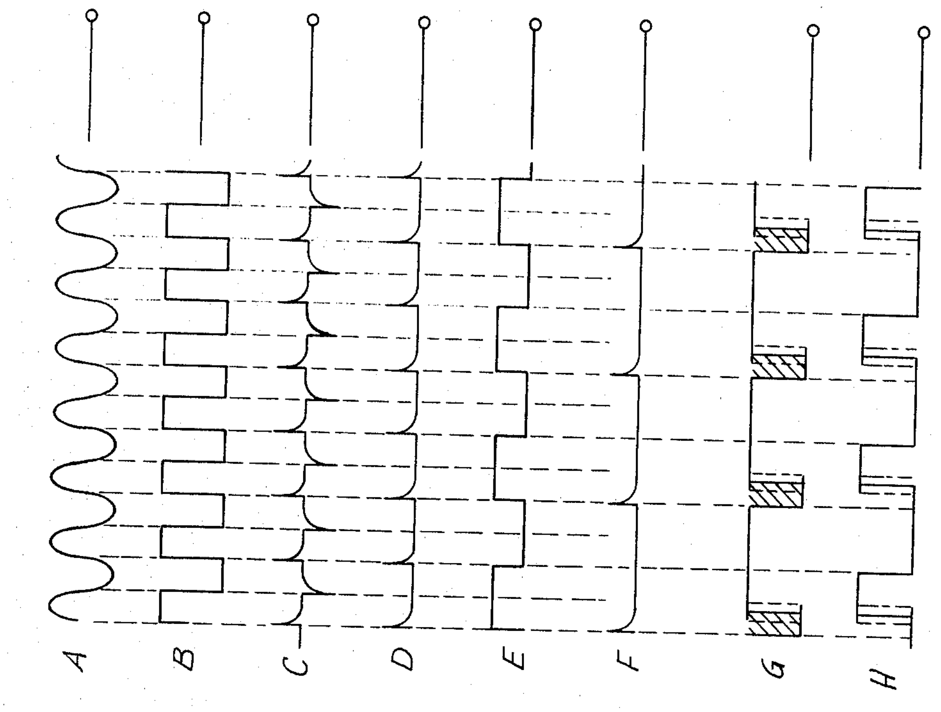
FIG. 4 is a graphical representation of various waveforms produced by corresponding elements depicted in FIG. 2.

The operation of the motor drive servo system 200, as thus far described, will now be explained. To facilitate the following explanation, reference may be had to the waveform representations illustrated in FIG. 4. During a normal reproducing operation, the PLAY control knob 13 of FIG. 1 is positioned at its PLAY location and the STILL control knob 15 is positioned at its NORMAL location. Consequently, the switch 46 of FIG. 2 engages the NORMAL contact thereof and electric motor 26 is suitably energized to drive the rotary arm 6 whereby the rotary heads 5 scan the magnetic tape deployed about the tape guide drum. Additionally, the capstan 11 as well as the supply and take-up reels are also driven to advance the tape 8.

As the motor operates, the magnetic wheel 27 rotates in proximity to the magnetic transducer 28, thereby inducing a periodic signal having a frequency related to the speed of the motor. This signal may approximate a sinusoid such as the waveform illustrated in FIG. 4A. After suitable amplification and limiting by the amplifier 29 and the limiter 30, the sinusoid is shaped to a substantially rectangular wave, as depicted in FIG. 4B, to thereby present the differentiator 31 with a frequency signal representing the actual rotating speed of the rotary heads 5. The positive and negative transistions of the frequency signal are differentiated by the differentiator to thus produce positive and negative pulses as depicted in FIG. 4C. It is appreciated that these pulses represent the zero-crossing times of the signal generated by the magnetic transducer 28. The detector 32 responds only to the positive or negative differentiated pulses in accordance with the particularly poled rectifying device included therein. In the illustrated embodiment, the detector 32 permits only the positive differentiated pulses to be transmitted to the flip-flop circuit 33 as depicted in FIG. 4D.

The flip-flop circuit responds, in the usual manner, to the input pulses applied thereto to thus change the output state exhibited thereby in response to each pulse. Accordingly, the output pulses generated by the flip-flop circuit 33 admit of a pulse duration that is directly related to the frequency of the signal produced by the magnetic transducer 28, as illustrated in FIG. 4E. It is appreciated that if the frequency of the signal produced by the transducer 28 increases, the spacing between the pulses illustrated in FIG. 4D decreases to thereby decrease the pulse duration of the output pulses generated by the flip-flop circuit 33. Conversely, if the frequency of the signal produced by the transducer decreases, the spacing between the successive pulse of FIG. 4D increases to thereby increase the pulse duration of the output pulses generated by the flip-flop circuit.

The pulses of FIG. 4E are applied to an input terminal of the coincident circuit 34 and, additionally, to the triggering input terminal of the pulse generator that is here illustratively depicted as a monostable multivibrator. The combination of the capacitor 37, the diode 38 and the resistor 39 serves to supply the monostable multivibrator with shaped triggering pulses of the type depicted in FIG. 4F. It is appreciated that as each triggering pulse is applied to the monostable multivibrator the multivibrator is triggered to its unstable state for a duration determined by the time constant thereof. It is recalled that the time constant of the illustrative monostable multivibrator is determined by the capacitor 47 and a selected one of the resistors 44 and 45. If the switch 46 is in engagement with its NORMAL contact, the time constant of the monostable multivibrator is, in this example, determined by the combination of the capacitor 47 and the resistor 45. Accordingly, the monostable multivibrator supplies pulses of the type depicted in FIG. 4G to an input terminal of the coincidence circuit 34. It is recognized that the negative transistions of these pulses, i.e., the cross-hatched negative pulses, admit of a duration determined by the time constant of the monostable multivibrator. Such duration may be varied, as desired by adjusting the resistance value exhibited by the resistor 45.

The coincidence circuit 34 responds to the pulses applied thereto to generate an output pulse having a duration equal to the coinciding portions of the pulses illustrated in FIGS. 4E and 4G. It is recognized that the output pulse produced by the coincidence circuit, as illustrated in FIG. 4H, admits of a positive transition coinciding with the positive transition of the FIG. 4G pulse and a negative transition coinciding with the negative transition of the FIG. 4E pulse. Hence, the output pulse shown in FIG. 4H is proportional to the difference in the durations of the pulses produced by the flip-flop circuit 33 and the illustrated monostable multivibrator. This output pulse is integrated by the integrator 47 whereby a voltage magnitude is produced that is proportional to the duration of the output pulse. Typically, the output voltage produced by the integrator 47 is a DC voltage. The amplifier 68 converts the voltage magnitude supplied thereto by the integrator 47 to a suitable motor energizing signal for application to the motor 26. It may be appreciated that if the motor 26 comprises a conventional DC motor, the amplifier 68 may comprise a compatible amplifying circuit adapted to supply a corresponding DC energizing current to the motor. Alternatively, if the motor comprises a conventional AC motor, the amplifier 68 may include conventional inverter circuitry to supply the motor with appropriate AC energizing current. Clearly, the amplifier and motor are conventional, and the amplifier is compatible with the particular motor employed to supply the appropriate driving energy therefor.

It is appreciated that if the output speed of the electric motor 26 varies, such variation is directly reflected in the pulse duration of the pulses applied to the coincidence circuit 34 by the flip-flop circuit 33. However, and disregarding the operation of the relative position detector 202 for the moment, the duration of the pulses applied to the coincidence circuit by the monostable multivibrator is substantially constant. Consequently, the duration of the output pulses produced by the coincidence circuit will vary in accordance with variations in the flip-flop circuit output pulse duration, and thus in variations in the motor speed from a predetermined value. More particularly, as the electric motor speeds up, the duration of the output pulses produced by the coincidence circuit 34 may be seen to decrease, thereby reducing the energy supplied to the motor by the amplifier 68, resulting in a slowing down of the motor and a return to the predetermined scanning speed. Conversely if the output speed of the motor decreases, the duration of the pulses produced by the coincidence circuit 34 increases, resulting in an increase in the energy applied to the motor to restore the rotary heads to the predetermined scanning speed.

IT is recalled that variations in the proper positioning of the rotary heads with respect to the tape 8 and the frames of information recorded on the tape cause the sampled voltage magnitude derived by the sampling circuit 20 to increase and decrease accordingly. The sampled voltage magnitude, which is stored in the holding circuit 23, is applied by the amplifier 24 to the monostable multivibrator as a bias voltage therefor. A variation in this bias voltage from a predetermined value, will affect the duration of the output pulses produced by the monostable multivibrator as depicted in FIG. 4G. For example, if the bias voltage applied to the monostable multivibrator by the amplifier 24 increases, representing that the rotary heads lag behind the frames of prerecorded information, the duration of the negative-going pulse produced by the monostable multivibrator is caused to decrease. Consequently, the output pulses produced by the coincidence circuit 34 and depicted in FIG. 4H increase to thereby increase the supply of energy to the electric motor 26. Hence, the rotating speed of the rotary heads 5 increases to thereby restore the phase of the rotary heads to its predetermined value. Conversely, if the rotary heads lead the frames of prerecorded information, it is appreciated that the bias voltage applied to the monostable multivibrator by the amplifier 24 decreases to thereby increase the duration of the negative-going pulses produced by the monostable multivibrator. Accordingly, the duration of the coincidence circuit output pulses depicted in FIG. 4H decreases to thereby decrease the energy supplied to the electric motor, resulting in a return of the rotary heads to their proper phase. In this manner, the speed and phase of the rotary heads are controlled to thereby permit a synchronized reproduction of the prerecorded signals disposed on the magnetic tape 8.

Now let it be assumed that the STILL control knob illustrated in FIG. 1 is positioned in its STILL location to thereby arrest the movement of tape 8 to effect plural reproductions of the information recorded on the limited portion of the magnetic tape that is maintained stationary on the periphery of the guide drum. For those applications wherein the present invention is employed in video tape recording apparatus (VTR), it is appreciated that the operation of the STILL control knob permits the display of a stop-action or frozen video picture. Such operation of the STILL control knob causes the switch 46 to engage its STILL contact. The manner in which the switch 46 is operated will be described in detail hereinbelow with respect to FIG. 3.

It is appreciated that the foregoing operation of the switch 46 serves to vary the pulse duration of the pulses supplied to the coincidence circuit 34 by the pulse generator illustratively described herein as a monostable multivibrator by varying the time constant thereof. More particularly, the time consstant of the monostable multivibrator is now determined by the combination of the capacitor 47 and the resistor 44. Of course, the precise time constant of the multivibrator may be further adjusted by varying the resistance value exhibited by the resistor 44. As the resistor 45 is no longer included in the operating circuit of the monostable multivibrator it is appreciated that the bias voltage heretofore applied thereto by the amplifier 24 now has no affect upon the duration of the pulses generated by the multivibrator.

It should be recognized that during the still reproducing mode of operation, the rotating speed of the rotary heads 5 should be varied from the rotating speed thereof during the normal reproducing mode of operation. Consequently, it is expected that the time constant of the monostable multivibrator, that is, the duration of the pulses produced thereby, now differs from that previously described during the normal reproducing mode of operation. Accordingly, the illustrated motor drive servo system 200 now serves to regulate the electric motor such that the output speed thereof is substantially maintained at the value represented by the duration of the pulses produced by the monostable multifibrator. It is understood that the manner in which the electric motor is now controlled is substantially identical to that described hereinabove with reference to FIGS. 4A – 4H. Of course, the variation in the duration of the pulses depicted in FIG. 4G by the bias voltage previously applied by the amplifier 24 is here not present. Thus, although the magnetic tape 8 is held stationary, the proper frequency of a horizontal synchronizing pulse, for example, that may be recorded on the magnetic tape is accurately reproduced as well as a colored subcarrier signal, for example, by varying the rotating speed of the rotary heads 5 in a complementary manner.

As an example, if during a normal reproducing mode of operation, the tape is moved in a direction that is substantially opposite to the direction in which the rotary heads 5 scan the skewed record tracks of the tape, it is appreciated that the relative tape scanning speed is reduced when the tape is stopped during the still reproducing mode of operation. Consequently, to accurately reproduce the prerecorded signals at the proper frequencies thereof, it is appreciated that the relative tape scanning speed must be increased by correspondingly increasing the rotating speed of the rotary heads. It has been found that the normal rotating speed of 30 r.p.s. during the normal reproducing mode, must be increased by approximately 1.7 percent to 30.5 r.p.s. to synchronously reproduce the prerecorded signals on the magnetic tape during the still reproducing mode.

Conversely, if during the normal reproducing mode, the rotary heads 5 scan the skewed record tracks of the tape 8 in a direction that is generally the same as the direction in which the tape is advanced, it is recognized that the relative tape scanning speed is increased when the tape is stopped during a still reproducing mode. Accordingly, the rotating speed of the rotary heads 5 must be correspondingly reduced during such still reproducing mode to accurately and synchronously reproduce the signals prerecorded on the magnetic tape. Therefore, it should be recognized that the signal representing the given speed of the rotary heads must be selectively variable to properly control the rotation of the heads during each mode of operation. Stated otherwise, the servo center of the motor drive servo system 200 is selectable in accordance with the relationship between the normal movement of the tape and the scanning direction of the rotary heads, as well as the particular desired rotating speed of the rotary heads during each mode of operation.

Figure 3:
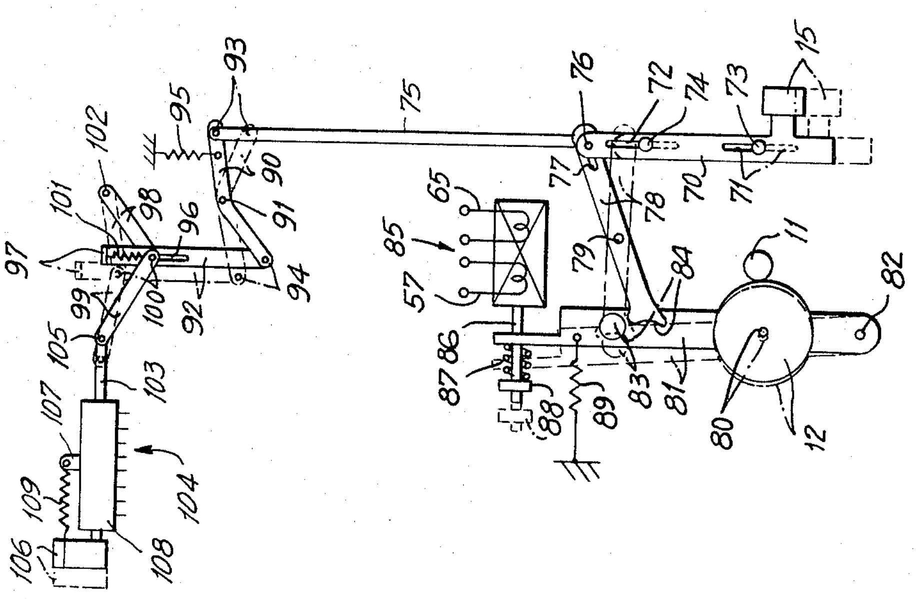
FIG. 3 is a schematic diagram of a preferred embodiment of further apparatus in accordance with the present invention whereby the operation of the magnetic recording and/or reproducing device is controlled.

The manner in which the STILL control knob effects a selective change in the reproducing mode of the magnetic recording and/or reproducing device will now be described. FIG. 3 illustrates an exemplary embodiment of the mechanical components and linkages coupled to the STILL control knob 15, and FIG. 2 depicts exemplary control apparatus that cooperates with the mechanical elements of FIG. 3. In particular, the STILL control knob 15 is seen to comprise a projection on a slide lever 70, the slide lever having two elongated apertures 71 and 72. A suitable support or base plate of the magnetic recording and/or reproducing device, not shown, may be provided with two upstanding pins 73 and 74 which extend through the elongated apertures in the slide lever 70 to thereby guide the slide lever along a predetermined path. A connecting pin 76 is provided at one end of the slide lever to join the slide lever to a connecting rod 75 and an arm 78. The pin 76 is inserted in an aperture 77 included in the arm 78, the arm being rotatable about its axis 79.

The pinch roller 12 includes a rotatable axis 80 which is secured to a pinch roller arm 81. The pinch roller arm is suitably fixed to support structure of the magnetic recording and/or reproducing device, not shown, by a pin 82 about which the pinch roller 81 pivots. As illustrated, the capstan 11 is fixedly positioned adjacent the pinch roller 12 whereby pivot action of the pinch roller arm 81 serves to bring the pinch roller 12 into pressure contact therewith. The pinch roller arm additionally includes an upstanding abutment or pin 83 mounted thereon, the pin 83 being adapted to be received by the curved extremity 84 of the arm 78. As is illustrated, the positioning of the arm 78 such that the curved extremity 84 thereof receives the pin 83 requires the displacement of the pinch roller arm 81, as by pivotal motion thereof about the pivot pin 82.

A solenoid device 85 having a conventional armature element 86 is provided, and further includes a first energizing coil 57 and a second energizing coil 65. Movement of the armature element is adapted to pivot the pinch roller arm 81 about the pivot pin 82 whereby the pinch roller 12 may be driven into and out of pressure contact with the capstan 11. Accordingly, the pinch roller arm 81 includes a suitable mounting hole at its remote extremity through which the armature element 86 is positioned, to provide a mechanical linkage between the arm and the armature element. The armature element further includes a stopper member 88 secured to an outer portion thereof and a coil spring 87 interposed between the stopper member 88 and that portion of the pinch roller arm 81 that is linked to the armature element. It may be recognized that the coil spring 87 serves to transmit a mechanical force provided by movement of the armature element 86 to the pinch roller arm 81. A bias spring 89 is suitably fastened to the pinch roller arm 81 to exert a counterclockwise biasing force thereon.

The connecting rod 75 is fastened, at the end thereof remote from the slide lever 70, to a joint arm 90 that is comprised of two angular portions joined at a rotary axis 91. The rotary axis is suitably supported on a support structure, not shown, of the magnetic recording and/or reproducing device. As illustrated, the connecting rod 75 is fastened to an extremity of the joint arm 90 by a conventional pin 93. The joint arm is further biased in the counterclockwise direction about its rotary axis 91 by a biasing spring 95.

The joint arm is secured by a pin 94 to an arm 92, the latter including a longitudinal aperture 96 through which extends a pin 100. The arm 92 also includes a shoulder 97 at the end remote from the joint arm 91 to which is secured a coil spring 101 that serves to bias the pin 100 in the upward direction. The pin 100 is adapted to be slidably guided in the longitudinal aperture 96 and is further secured to twin arm 98 and 99, respectively. The twin arm 98 is pivoted about a pivot 102, the latter being suitably fastened to support structure of the magnetic recording and/or reproducing device. The twin arm 99 is secured by a pin 105 to a rod 103. The rod is preferably a control armature or movable contact (or contacts) of switch 104.

The switch 104 is, in this embodiment, a conventional dual action or ganged switch including first and second movable contacts adapted for simultaneous movement between their respective stationary contacts. Accordingly, the switch 104 may include therein the aforedescribed switch 46 and a switch 51, the latter included in the tape run energizing circuit to be described below. It may be appreciated that the movement of rod 103 by the twin arm 99 serves to selectively position each of the movable contacts of the switches 46 and 51 at their NORMAL and STILL contacts. The arm 103 may further extend through the housing of the switch 104 to be secured to a plate 106 movable therewith. A shoulder portion 107 or other suitable member is provided on the housing of the switch 104 to receive a coil spring 109 interposed between the member 107 and the plate 106. It is appreciated that the coil spring 109 exerts a biasing force on the rod 103 to thereby urge the rod to its rightmost position. It may be assumed that when the rod 103 is disposed in its illustrative position, the switches 46 and 51 engage their respective NORMAL contacts, whereas movement of the rod 103 to its leftmost position serves to position each of switches 46 and 51 at its respective STILL contact.

Although not shown herein, it may be appreciated that conventional mechanical or electromechanical braking devices may be mechanically or electrically coupled to the apparatus depicted in FIG. 3 to thereby effect the brakng of the supply and/or take-up reels when the slide lever 70 is operated by movement of the control knob 15 to its STILL position.

Briefly, when the magnetic recording and/or reproducing device is disposed in a normal reproducing mode the mechanical linkage illustrated in FIG. 3 assumes the position depicted in solid lines. Thus, arm 78 is rotated about its axis 79 to position the curved extremity 84 thereof out of engagement with the pin 83 mounted on the pinch roller arm 81. Accordingly, the force exerted on the pinch roller arm by the coil spring in response to the movement of the armature element 86 (to be described) overcomes the spring biasing force exerted by the spring 89 to thus permit the pinch roller arm to pivot about its pivot pin 82 to thereby urge the pinch roller 12 into pressure contact with the capstan 11. Accordingly, magnetic tape interposed between the capstan and pinch roller is advanced at a controlled rate.

Additionally, when disposed in its NORMAL position, the slide lever 70 drives the connecting rod 75 in an upward direction to pivot the joint arm 90 about its pivot axis 91. Accordingly, the arm 92 is moved downward and to the right causing the twin arm 98 to rotate in the counterclockwise direction about pin 92 and further drawing the twin arm 99 to the right to thus extend the rod 103 as shown. Accordingly, the switch 104 positions each of its movable contacts to its NORMAL location.

It should be recognized that the pivoting of the pinch roller arm 81 about the pivot pin 82 occurss only if the solenoid 85 is energized to thus pull in its armature element 86. The movement of the armature element compresses the spring 87 between the stopper member 88 and the pinch roller arm 81 to thereby exert the necessary force on the pinch roller arm to thus pivot the arm about its pivot pin. The manner in which the solenoid 85 is energized will be described hereinbelow. Nevertheless, it may merely be noted that energization of the solenoid to pull in its armature requires that both coils 57 and 65 be energized. However, once the armature 86 is pulled in, the armature may be maintained in that configuration merely by the energization of one of the coils 57 and 65.

Let it now be assumed that the reproducing mode of the magnetic recording and/or reproducing device is to be changed to a still mode of reproduction. Let it further be assumed that, normally during the normal reproducing mode, only one of the coils 57 and 65 is energized. Accordingly, movement of the control knob 15 to its STILL position serves to drive the slide lever 70 and connecting rod 75 in the downward direction. The pin linking the arm 78 to the slide lever 70 serves to rotate the arm in the clockwise direction about its axis 79. This rotation forces the curved extremity 84 to drive the pin 83 on the pinch roller arm 81 to the left. The force exerted on the pin 83 by the cam surface of the curved extremity 84 is sufficient to overcome the pulled-in retaining force exerted on the armature 86 by the solenoid 85. Furthermore, the force exerted on the pin 83 by the arm 78 is aided by the biasing force exerted on the pinch roller arm 81 by the bias spring 89. Consequently, the pinch roller arm 81 is forced to pivot about its pivot pin 82 in the counterclockwise direction to thus displace the pinch roller 12 from the capstan 11 and to extend the armature 86 to the position illustrated in broken lines.

Additionally, the downward movement of connecting rod 75 serves to rotate the joint arm 90 in the clockwise direction about its rotary axis 91. The arm 92, secured to the joint arm by the pin 94, is driven upward and to the left to thereby assume the position illustrated in the broken lines. This movement of the arm 92 drives the twin arm 99 to advance the rod 103 to the left. Accordingly, the respective movable contacts included in the switch 104 respond to the movement of the rod 103 to engage their respective STILL contacts.

In this manner, the mode of operation of the magnetic recording and/or reproducing device is changed to permit the still reproduction of prerecorded information. The displacement of the pinch roller 12 from the capstan 11 together with the suitable braking of the supply and take-up reels, not shown, serves to arrest the movement of the magnetic tape 8 and to maintain the tape in stationary relation such that the limited portion thereof deployed about the guide drum 1 is repetitively scanned by the rotary heads 5. A return of the control knob 15 to its NORMAL position results in the return of the apparatus depicted in FIG. 3 to the position represented by the solid lines. It is appreciated the the various biasing springs 95, 101 and 109 cooperate to restore the mechanical linkage to the normal position.

The tape run energizing circuit 205 illustrated in FIG. 2, and the manner in which the circuit cooperates with the mechanical linkage illustrated in FIG. 3, will now be described. The tape run energizing circuit 205 includes an input terminal 49 adapted to receive a signal, such as a DC level, whenever the control knob 13 illustrated in FIG. 1 is positioned at its PLAY location. Thus, it may be appreciated that when the magnetic recording and/or reproducing device is disposed in the normal or still reproducing mode, a DC level is applied to the input terminal 49.

The terminal 49 is coupled via diode 50 to a first coil energizing circuit coupled to the first energizing coil 57 included in the solenoid 85 and to a second coil energizing circuit coupled to the second energizing coil 65. The first coil energizing circuit includes first and second transistors 53 and 54 disposed in coil driving relation. Accordingly, the base electrode of the transistor 53 is coupled to the diode 50 by a resistor 52. The collector electrode of the transistor is coupled to one side of coil 57. The emitter electrode of the transistor is coupled to the base electrode of the transistor 54 by an emitter resistor 55. The transistor 54 includes an emitter electrode connected to ground and a collector electrode coupled to the other side of the energizing coil 57. Additionally, the base electrode of the transistor 54 is coupled to ground by a resistor 56. As indicated, a diode 58 is connected across the coil 57 in conventional manner to mitigate abrupt voltage changes thereacross. The collector electrodes of the respective transistors are coupled to the source 40 of suitable energizing potential.

The second coil energizing circut is substantially similar to the first energizing circuit and includes first and second transistors 59 and 66 disposed in coil driving relation. A switch 51 couples the diode 50 to an input circuit connected to the base electrode of the transistor 59. As illustrated, such input circuit is comprised of an input resistor 61 connected in series with a capacitor 60 to the base electrode of the transistor 59. The junction defined by the series connection of the capacitor 60 and the resistor 61 is connected to ground by the resistor 63. Additionally, a diode 64 is connected between the base electrode of the transistor 59 and ground. The collector electrode of the transistor 59 is coupled to one side of the energizing coil 65 and the emitter electrode of the transistor is coupled via resistor 68 to the base electrode of the transistor 66. The base electrode of the transistor 66 is additionally coupled to ground by a resistor 67. Moreover, the emitter electrode of the transistor 66 is coupled to ground and the collector electrode of the transistor is coupled to the other sside of the energizing coil 65. A diode 69, similar to the aforementioned diode 58, is connected across the energizing coil 65. The collector electrodes of the respective transistors are coupled to the source 40 of suitable energizing potential.

It may be observed that the input circuit coupled to the base electrode of the transistor 59 is responsive to a positive voltage transistion applied thereto to drive the transistor to its conducting state. However, once the capacitor 60 of the input circuit has sufficiently charged in ressponse to an input positive transition, voltage is no longer applied to the base electrode of the transistor 59, thereby biasing the transistor to its nonconducting state. The switch 51 is coupled to the just-described input circuit by its NORMAL stationary contact. The STILL contact is seen to be electrically isolated.

In operation, it will be assumed that the PLAY control knob 13 is positioned at its PLAY location and that the control knob 15 is positioned at its NORMAL location to thereby permit a normal mode of signal reproduction. Consequently, switch 51 is positioned at its NORMAL contact. When the control knob 13 is initially positioned at the PLAY location, a positive DC voltage level is applied to the input terminal 49. It is appreciated that the application of this DC voltage to the input terminal 49 is accompanied by an initial positive transition. Accordingly, the positive DC level is coupled to the base electrode of the transistor 53 by the diode 50 to thereby bias the transistor to its conducting state. Moreover, the transistor 54 is likewise biased to its conducting state by the application thereto of a positive voltage derived at the emitter electrode of the transistor 53. Consequently, the current is permitted to flow through the energizing coil 57.

The positive transition applied to the input terminal 49 is coupled by diode 50 through switch 51 to its NORMAL contact to the input circuit coupled to the base electrode of the transistor 59. It is appreciated that the rapid increase in voltage attributed to the positive transition of the input signal permits a rapidly increasing direct current pulse to be transferred through the capacitor 60 to the base electrode of the transistor 59, thereby biasing the transistor to its conducting state. Transistors 59 and 66 are seen to be driven to their respective conducting states to thereby permit current to flow through the energizing coil 65. Consequently, the energization of both coils 57 and 65 serves to energize the solenoid 85 to thus pull in the armature 86, resulting in the pivotal movement of the pinch roller arm 81 about the pivot pin 82, thereby urging the pinch roller 12 into pressure contact with the capstan 11.

After a predetermined time determined by the time constant established by the capacitor 60 and the resistors 61 and 63, the positive pulse applied to the base electrode of the transistor 59 terminates to thus return the transistor to its nonconducting state. Similarly, the transistor 66 is biased to its nonconducting state and current ceases to flow through the energizing coil 65. Nevertheless, it is recalled that the continued energization of coil 57 is sufficient to maintain the armature 86 in its pull in configuration.

If a still reproducing mode is desired, the control knob 15 is operated to effect the configuration of the mechanical linkage described above with respect to FIG. 3. Thus, however, has no effect on the illustrated tape run energizing circuit 205. That is, the movement of the switch 51 from its NORMAL contact to its STILL contact does not de-energize coil 57. Similarly, the de-energized coil 65 is not now energized by movement of the switch 51.

If, now, it is desired to return to the normal reproducing mode, the control knob 15 is returned to its NORMAL position to thereby switch the movable contact of switch 51 to its NORMAL contact. It is recalled that the DC level provided at the input terminal 49 has been maintained thereat because the control knob 13 has remained at its PLAY location. However, as the switch 51 engages its NORMAL contact, a positive transition is applied thereto, which positive transition results in the application of a positive pulse to the base electrode of the transistor 59. Consequently, the transistor is driven to its conducting state for a sufficient period of time to energize coil 65 for a relatively brief period of time. The solenoid 85 is thus energized to permit the armature 86 to be pulled in as described above. When the capacitor 60 has charged, the biasing voltage applied to the base electrode of the transistor 59 is terminated and the transistor returns to its nonconducting state, resulting in the de-energization of the coil 65. In this manner, the movement of switch 51 to its NORMAL contact urges the pinch roller 12 into pressure contact with the capstan 11 to thus permit magnetic tape to be controllably driven thereby.

It should be apparent to those of ordinary skill in the art that the present invention admits of a plurality of alterations and modifications which in no way change the basic teachings thereof. For instance, the pulse generating circuits included in the signal source 204 may comprise any convenient pulse generator whereby the duration of the output pulse generated thereby may be selectively varied as desired to thus represent a first, or normal, scanning speed and a second, or still, scanning speed. The polarity of the generated pulses, although described above as positive, may obviously be negative; and appropriate circuitry may be provided that is compatible with negative pulses. In addition, the motor drive servo system may utilize a comparison between signal magnitudes as opposed to the aforedescribed pulse duration comparisons, to control the speed of the electric motor 26. Moreover, conventional braking mechanisms may be provided for cooperation with the supply and take-up reels during a still reproducing mode of operation. Also, although the present invention finds ready application with video tape recording apparatus, it should be recognized that the use thereof need not be limited to a particular recording and/or reproducing device.

Therefore, while the invention has been particularly shown and described with reference to a specific preferred embodiment thereof it will be obvious to those skilled in the art that the foregoing and various other changes and modifications in form and details may be made without departing from the spirit and scope of the invention. It is, therefore, intended that the appended claims be interpreted as including all such changes and modifications.

What is claimed is:

1. In a magnetic recording and/or reproducing device having a rotary magnetic recording/reproducing head and a tape guide drum about which is wrapped a run of movable magnetic tape, the rotary magnetic head scanning the run of magnetic tape in skewed relation thereto to record information on the magnetic tape or reproduce information from the magnetic tape; apparatus for controlling the rotary head, comprising:

driving means for rotating the rotary magnetic head;

mode changing means for selectively changing the mode of operation of the magnetic recording and/or reproducing device between a normal reproducing mode wherein the magnetic tape moves and the rotary magnetic head moves relative to the tape and a still reproducing mode wherein plural reproductions of the information recorded on a limited portion of the magnetic tape are made;

tape run control means responsive to said mode changing means for stopping the movement of said magnetic tape when the mode of operation of the magnetic recording and/or reproducing device is changed from a normal reproducing mode to a still reproducing mode; and drive control means coupled to said driving means for controlling the rotating speed of the rotary magnetic head for each of said modes of operation of the magnetic recording and/or reproducing device such that a first rotating speed at which said rotary magnetic head is driven during a normal reproducing mode of operation is changed to a second rotating speed during a still reproducing mode of operation.

2. The apparatus of claim 1 wherein said drive control means includes speed selecting means responsive to said mode changing means for selecting said first and second rotating speeds in response to the selected operation of said mode changing means.

3. The apparatus of claim 2 wherein said drive control means includes gate means for comparing a signal representing the actual rotating speed of the rotary magnetic head to a signal derived from the speed selecting means and representing a selected speed of the rotary magnetic head to supply a driving signal to said driving means, whereby the rotating speed of the rotary magnetic head is varied to conform to said selected speed.

4. The apparatus of claim 3 wherein said driving means comprises an electric motor and said driving signal comprises a motor energizing signal.

5. The apparatus of claim 4 further including position detecting means for detecting the relative positions of the magnetic tape and the rotary magnetic head; and means for varying the signal derived from the speed selecting means in accordance with the detected relative positions when said mode changing means selects the normal reproducing mode of operation.

6. In a magnetic recording and/or reproducing head and a tape guide drum about which is wrapped a run of movable magnetic tape, the roatry magnetic head scanning the run of magnetic tape in skewed relation thereto to record information on the magnetic tape or reproduce information from the magnetic tape; apparatus for controlling the rotary head, comprising:

driving means for rotating the rotary magnetic head;

mode changing means for selectively changing the mode of operation of the magnetic recording and/or reproducing device between a normal reproducing mode wherein the magnetic tape moves and the rotary magnetic head moves relative to the tape and a still reproducing mode wherein plural reproductions of the information recorded on a limited portion of the magnetic tape are made;

tape run control means responsive to said mode changing means for stopping the movement of said magnetic tape when the mode of operation of the magnetic recording and/or reproducing device is changed from a normal reproducing mode to a still reproducing mode; and drive control means coupled to said driving means for controlling the rotating speed of the rotary magnetic head for each of said modes of operation of the magnetic recording and/or reproducing device such that a first rotating speed at which said rotary magnetic head is driven during a normal reproducing mode of operation is changed to a second rotating speed during a still reproducing mode of operation, said drive control means including relative position detecting means for detecting the relative positions of the magnetic tape and the rotary magnetic heads first pulse generating means for generating a first pulse having a duration representing the actual rotating speed of the rotary magnetic head; and second pulse generating means for generating a second pulse having a duration representing a selected speed of the rotary magnetic head, said second pulse duration being variable in accordance with detected relative positions of the magnetic tape and the rotary magnetic head.

7. The apparatus of claim 6 wherein said drive control means comprises pulse duration comparison means for producing a motor energizing signal proportional to the difference between said first and second pulse durations.

8. The apparatus of claim 7 wherein said second pulse generating means comprises a monostable multivibrator admitting of a selectively variable time constant and actuable by said first pulse, the time constant of said monostable multivibrator being selected in response to the operation of said mode changing means and being further varied by a bias voltage applied to said monostable multivibrator by said relative position detecting means.

9. The apparatus of claim 8 wherein said monostable multivibrator includes a switch for selecting a first time constant when said mode changing means selects a normal reproducing mode and a second time constant when said mode changing means selects a still reproducing mode.

10. The apparatus of claim 6 wherein said relative position detecting means comprises transducing means for sensing the position of the moving magnetic tape; voltage generating means coupled to said transducing means for generating a voltage having a magnitude dependent upon the sensed position of the magnetic tape; head position transducing means for sensing the position of the rotary magnetic head; sampling pulse generating means coupled to said head position transducing means for generating sampling pulses dependent upon the sensed position of the rotary magnetic head; and sampling means coupled to said voltage generating means and said sampling pulse generating means for sampling said generated voltage magnitude at sampling times determined by the sampling pulses to produce a bias voltage being adapted to be applied to said second pulse generating means for varying the durations of said second pulse.

11. The apparatus of claim 10 wherein said voltage generating means comprises a saw tooth waveform generator.

12. The apparatus of claim 10 wherein said sampling means comprises a sample-and-hold circuit.

13. The apparatus of claim 6 wherein said firsst pulse generating means comprises a motor speed transducer for sensing the speed of the electric motor and for generating a motor speed signal having a frequency proportional to the sensed motor speed; and a pulse width convertng circuit coupled to the motor speed transducer for generating said first pulse having a duration proportional to the frequency of said motor speed signal.

14. The apparatus of claim 13 wherein said drive control means includes an AND gate coupled to said pulse width converting circuit for producing an output pulse having a duration proportional to the difference between the duration of said first pulse and the duration of said second pulse; and energizing means coupled to said AND gate for producing an energizing signal for said electric motor, said energizing signal having a magnitude proportional to the output pulse duration.

15. In a magnetic recording and/or reproducing device having a rotary magnetic recording/reproducing head and a tape guide drum about which is wrapped a run of movable magnetic tape, the rotary magnetic head scanning the run of magnetic tape in skewed relation thereto to record information on the magnetic tape or reproduce information from the magnetic tape; apparatus for controlling the rotary head, comprising:

driving means for rotating the rotary magnetic head;

mode changing means for selectively changing the mode of operation of the magnetic recording and/or reproducing device between a normal reproducing mode wherein the magnetic tape moves and the rotary magnetic head moves relative to the tape and a still reproducing mode wherein plural reproductions of the information recorded on a limited portion of the magnetic tape are made;

tape run control means rsponsive to said mode changing means for stopping the movement of said magnetic tape when the mode of operation of the magnetic recording and/or reproducing device is changed from a normal reproducing mode to a still reproducing mode and including a capstan in combination with a pinch roller for translating a run of magnetic tape interposed therebetween; and means for selectively positioning said pinch roller in pressure contact with said capstan when said mode changing means selects said normal reproducing mode and out of pressure contact with said capstan when said mode changing means selects said still reproducing mode; and drive control means coupled to said driving means for controlling the rotating speed of the rotary magnetic head for each of said modes of operation of the magnetic recording and/or reproducing device such that a first rotating speed at which said rotary magnetic head is driven during a normal reporducing mode of operation is changed to a second rotating speed during a still reproducing mode of operation.

16. The apparatus of claim 15 wherein said selective positioning means comprises solenoid means having a movable armature; a movable arm mechanically coupled to said armature and upon which said pinch roller is mounted; electrical means coupled to said solenoid means and responsive to the operation of said mode changing means to energize said solenoid means when the normal reproducing mode is selected, whereby said movable arm is moved in a first direction to position said pinch roller in pressure contact with said capstan; and mechanical means responsive to the operation of said mode changing means for urging said movable arm in a second direction to overcome the energization of said solenoid means, whereby said pinch roller is displaced from said capstan when the still reproducing mode is selected.

17. The apparatus of claim 16 wherein said solenoid means includes first and second energizing coils, whereby said armature is driven into an energized position in response to the energization of both said coils and said armature is maintained in said energized position in response to the energization of one of said coils.

18. The apparatus of claim 17 wherein said electrical means comprises means for receiving a coil energizing signal when said magnetic recording and/or reproducing apparatus is adapted to reproduce information from the magnetic tape; a first coil energizing circuit coupled to said first energizing coil; a second coil energizing circuit coupled to said second energizing coil; means for supplying said first coil energizing circuit with said coil energizing signal such that the first coil is energized whenever said coil energizing signal is received; and means responsive to said mode changing means for selectively supplying said second coil energizing circuit with said coil energizing signal when the mode of operation of the magnetic recording and/or producing device is changed to a normal reproducing mode.

19. The apparatus of claim 18 wherein ssaid means for selectively supplying comprises a switch for selectively interconnecting said coil energizing signal receiving means and said second coil energizing circuit when said mode changing means changes the mode of operation of the magnetic recording and/or reproducing device to the normal reproducing mode; and means for interrupting the supply of said coil energizing signal to said second coil energizing circuit after a predetermined time.

20. The apparatus of claim 16 wherein said mode changing means comprises manually operable mechanical linkage coupled to switch means included in said speed selecting means and said electrical means, and further coupled to said mechanical means; whereby operation of said mechanical linkage to select a normal mode of reproducing switches said speed selecting means to select the first scanning speed, switches the electrical means to energize the solenoid means to move said movable arm in said first direction and removes said mechanical means from an operating relation with respect to said movable arm to permit the movement of said movable arm, and whereby operation of said mechanical linkage to select a still mode of reproducing switches said speed selecting means to select the second scanning speed, switches the electrical means to reduce the energization of the solenoid means and drives the mechanical means against said movable arm to overcome the reduced energization of the solenoid means such that said movable arm is urged in said second direction.

* * * * *